United States Patent
Antonini

(10) Patent No.: US 8,927,445 B2
(45) Date of Patent: Jan. 6, 2015

(54) SEALING AGENT WITH LOW SOFTENING TEMPERATURE USEFUL IN THE PREPARATION OF ELECTRONIC DEVICES

(75) Inventor: Alessio Antonini, Vinci (IT)

(73) Assignee: Daunia Solar Cell S.r.l., Foggia (IT)

( * ) Notice: Subject to any disclaimer, the term of this patent is extended or adjusted under 35 U.S.C. 154(b) by 32 days.

(21) Appl. No.: 13/823,290

(22) PCT Filed: Sep. 16, 2010

(86) PCT No.: PCT/IT2010/000394
§ 371 (c)(1),
(2), (4) Date: Apr. 11, 2013

(87) PCT Pub. No.: WO2012/035565
PCT Pub. Date: Mar. 22, 2012

(65) Prior Publication Data
US 2013/0217560 A1    Aug. 22, 2013

(51) Int. Cl.
*C03C 3/064* (2006.01)
*C03C 3/068* (2006.01)
*C03C 3/066* (2006.01)
*C03C 8/24* (2006.01)
*C03C 8/04* (2006.01)
*C03C 8/08* (2006.01)
*C03C 8/14* (2006.01)
*C03C 8/16* (2006.01)
*C03C 8/20* (2006.01)

(52) U.S. Cl.
CPC . *C03C 8/24* (2013.01); *C03C 3/066* (2013.01); *C03C 3/068* (2013.01); *C03C 8/04* (2013.01); *C03C 8/08* (2013.01); *C03C 8/14* (2013.01); *C03C 8/16* (2013.01); *C03C 8/20* (2013.01)
USPC ................... 501/78; 501/77; 501/79

(58) Field of Classification Search
CPC .......... C03C 3/064; C03C 3/066; C03C 3/068
USPC ......................... 501/73, 77, 78, 79
See application file for complete search history.

(56) References Cited

U.S. PATENT DOCUMENTS

| 6,255,239 | B1* | 7/2001 | Sakoske ................ 501/77 |
| 6,778,355 | B2* | 8/2004 | Hasegawa et al. ....... 360/119.05 |
| 2006/0105898 | A1 | 5/2006 | Ide |
| 2009/0272294 | A1 | 11/2009 | Yamada et al. |

FOREIGN PATENT DOCUMENTS

| EP | 1291329 | 3/2003 |
| EP | 1496025 | 1/2005 |
| EP | 2168927 | 3/2010 |
| JP | 2002241143 | 8/2002 |
| JP | 2003095697 | 4/2003 |
| JP | 2003128430 | 5/2003 |
| WO | WO 2004037736 | 5/2004 |
| WO | WO 2009014029 | 1/2009 |

OTHER PUBLICATIONS

International Preliminary Report on Patentability mailed on Jan. 2, 2013 in International Application No. PCT/IT2010/000394, International Filing Date Sep. 16, 2010. (9 pages).
International Search Report mailed on May 5, 2011 in International Application No. PCT/IT2010/000394, International Filing Date Sep. 16, 2010. (5 pages).

* cited by examiner

*Primary Examiner* — Noah Wiese
(74) *Attorney, Agent, or Firm* — Novak Druce Connolly Bove + Quigg LLP

(57) ABSTRACT

The invention includes a composition for sealing agent, generally in the form of glass frit, lead-free, comprising by weight over the total weight of the composition: 30-80% $Bi_2O_3$; 2-10% ZnO; 2-10% $B_2O_3$; 0-5% $Na_2O$; 1-10% $SiO_2$; 1-8% $Al_2O_3$; 0-7% BaO; and 0-8% MgO. The composition for sealing agent as defined above can be added with a filler in a quantity up to 20% by weight over the total weight of the resulting mixture. The invention also includes a sealing paste containing the composition for sealing agent, the optional filler, an organic binder and optionally an organic solvent. The invention also includes methods for producing and using the composition for sealing agent and the sealing paste, as well as an electronic device sealed with the sealing paste.

11 Claims, No Drawings

SEALING AGENT WITH LOW SOFTENING TEMPERATURE USEFUL IN THE PREPARATION OF ELECTRONIC DEVICES

CROSS-REFERENCE TO RELATED APPLICATIONS

This application is a §371 national stage entry of International Application No. PCT/IT2010/000394, filed Sep. 16, 2010, which is hereby incorporated herein by reference in its entirety.

FIELD OF APPLICATION

In its most general aspect, the present invention concerns the industrial field of sealing agents for electronic devices like for example liquid crystal displays (LCD), light emitting diodes (LED), organic light emitting diodes (OLED), MEMS (Micro Electro Mechanical Systems) elements, fuel cells, dye-sensitized solar cells (DSSC).

More specifically, the present invention concerns a composition for sealing agent and a sealing paste comprising such a composition for applications in the sealing of the aforementioned electronic devices, in particular in dye-sensitized solar cells (DSSC).

PRIOR ART

It is known that in the production of electronic devices like for example LCDs, light emitting diodes (LEDs and OLEDs), MEMS elements, fuel cells and dye-sensitized solar cells (DSSC) the sealing must be carried out in an optimal manner. This is indeed essential to protect the inside of the aforementioned devices from the penetration of external humidity and gas that could jeopardise their initial performance characteristics and their lifetime.

In the particular case of DSSC cells, for example, the penetration of humidity and gas present in the atmosphere can lead to the degradation of the electrolytes, as well as of the organic metal dye contained in the cells (see Kohle et al., 1997 and Matsui et al. 2009), leading to a gradual degradation in performance of the cells.

Indeed, the electrolytes, like other components of the cell, can be chemically aggressive and therefore be particularly susceptible to the effects of the entry from the outside of gas and humidity. The sealing process for these devices is therefore particularly critical.

In the case of LEDs or OLEDs, the electrodes and the semiconductor layer can also be deteriorated by oxygen and humidity, which lead to a degradation of the devices themselves, noticeable in a decrease in contrast and in a reduction of the view angle (see patent application US 2009/0064717).

In the field some sealing agents for electronic devices are known, like for example Surlyn (Dupont), but their sealing capability is not considered to be particularly satisfactory.

For sealing, DSSC cells in particular. polymeric materials, bicomponent resins and thermoplastic films have been used in the past. Such cells subjected to ageing tests at high and low temperatures have displayed a progressive decrease in their performance due to the progressive degradation of the sealing material. (Sastrawan et al., 2006 and Hinsch et al., 2001)

However, it has been demonstrated (see the same authors) that only an inorganic material, like glass, can withstand this type of stress for a long time. Many electronic devices, indeed, like for example DSSCs, consist of substrates of vitreous or ceramic material. Due to the thermal stresses to which the aforementioned devices are subjected during the sealing step and, to a lesser extent during their use, the performance of a sealing agent in this type of application will be increasingly good the smaller the difference is between the linear thermal expansion coefficient values of the sealing agent and of the aforementioned vitreous material that makes up the device.

Satisfactory seals are obtained, therefore, by using sealing pastes based, for example, on glass frit. Sealing pastes based on glass frit, however, require high process temperatures that can damage the semiconductors present in the electronic devices to be sealed. Common sealing agents, indeed, are usually applied to the surfaces that make up the devices and then are subjected to a high sealing (or devitrification) temperature.

Electronic devices like for example LEDs, OLEDs, LCDs, MEMS, fuel cells and DSSCs, cannot withstand very high mechanical and thermal stresses and therefore they should not be subjected to temperatures over about 500° C. so as not to degrade their materials and performance. Common glass frit-based sealing pastes are therefore not always compatible with applications in the aforementioned devices.

In order to avoid this drawback, many sealing agents of the prior art contain lead (Pb) as lead oxide. This component, indeed, when present in high concentrations, contributes to lowering the softening temperature of the glass frit, thus allowing sealing agents to be prepared that can be processed at lower temperatures, therefore compatible with the requirements of the aforementioned electronic devices.

Lead, however, is strongly contraindicated since it is a heavy metal that is very toxic and thus harmful both to human health and the environment. Moreover, in the specific case of DSSCs, lead is chemically attacked by the iodine contained in the cell and forms insoluble salts that, over time, lead to the degradation of the functionality of the cell (Sastrawan et al. 2006). Moreover, again in Sastrawan et al. 2006, it is reported that glass frit containing lead contaminates the platinum counter electrode, leading to a higher charge transfer resistance, thus lowering the fill factor, a parameter strictly connected to the efficiency of the cell.

For these reasons, the producers of electronic devices, in particular of DSSCs, are currently oriented towards sealing materials free from lead and any other toxic material, for example antimony, cadmium, arsenic, thallium. There is, in particular, a need to tackle the problem of using sealing agents without lead or other toxic substances, melting at low temperatures, preferably below 500° C.

In recent years there has been a development of sealing pastes free from lead or with very low quantities of lead, containing glass frit comprising metal oxides and filler.

In particular, U.S. Pat. No. 5,252,521 claims glass coating enamels for example for automobile windows, drinks containers, lighting bulbs, etc., free from lead and consisting of mixtures of various oxides, in particular bismuth oxide, zinc oxide, boron oxide and other metals and with a low silicon content. However, there is no mention of their use in sealing pastes, nor of their application in the field of electronics, and in particular in DSSC cells.

Sastrawan et al. 2006 suggest the use of glass frits as a material suitable for sealing DSSC cells, but they say nothing about their composition and their characteristics necessary for use in DSSC cells and for their industrial development.

US 2009/0064717 claims glass frits and their use in sealing electronic devices such as OLEDs and DSSCs. However, such glass frits also comprise antimony oxides, a potentially carcinogenic metal, which makes these mixtures limited in their applications.

US 2010/0019674 describes glass frits for sealing agents that contain metal oxides such as aluminium, silicon and dysprosium oxides, suitable for withstanding particularly high operating temperatures. These products are used to seal particularly thermostable materials, for example the ceramic bodies constituting the base of lighting bulbs. Similarly, in US 2010/0086825 glass frits containing metal oxides such as calcium, magnesium, barium, boron, aluminium and silicon oxides are used in sealing processes at process temperatures of between 700 and 900° C.

Unlike the last references, the purpose of the present invention is to provide a sealing paste having excellent performance in terms of sealing and resistance to external gases and humidity, able to be applied at temperatures below 500° C., which does not contain lead or other materials recognised as toxic or in any case harmful to humans and/or to the environment, and which is particularly suitable for application on electronic devices like for example LCDs, LEDs, OLEDs, MEMS, fuel cells, dye-sensitized solar cells (DSSC), in particular the latter.

SUMMARY

The technical problem is solved by a composition for sealing agent, generally in the form of glass frit, free from lead, comprising the following oxides in percentage by weight over the total weight of the composition:

30-80% $Bi_2O_3$; 2-10% $ZnO$; 2-10% $B_2O_3$; 0-5% $Na_2O$; 1-10% $SiO_2$; 1-8% $Al_2O_3$; 0-7% $BaO$; and 0-8% $MgO$.

The composition for sealing agent can also contain one or more of the following oxides, in percentage by weight over the total weight of the composition: 0-1.5% $TeO_2$; 0-2% $SnO_2$; 0-3% $TiO_2$; 0-1.5% $Y_2O_3$; 1-2% $P_2O_5$; 0-1.5% $CaO$; 0-2% $K_2O$; 0-2% $Li_2O$, in which the sum of the concentrations of $CaO$, $Li_2O$ and $K_2O$ does not exceed 2% by weight over the total of the composition.

The composition for sealing agent as defined above can be added with a filler in a quantity up to 20% by weight over the total weight of the resulting mixture.

The present invention also refers to a sealing paste consisting of: the composition for sealing agent as defined above, the optional filler, an organic binder and optionally an organic solvent. Preferably, said paste contains, by weight over the total of the paste: 70-90% of composition for sealing agent (including the optional filler), 1-30% of organic binder and 0-20% of organic solvent.

The invention also comprises methods for producing the composition for sealing agent and the sealing paste defined above.

Moreover, the invention comprises the use of the sealing paste defined above in the production of electronic devices such as DSSC cells, LCDs, LEDs, OLEDs, MEMS elements, fuel cells, preferably DSSC cells.

Finally, the present invention comprises an electronic device sealed with the paste defined above, such a device being in particular a DSSC cell, an LCD, an (O)LED, a MEMS element, or a fuel cell, preferably a DSSC cell.

DETAILED DESCRIPTION OF THE INVENTION

The composition for sealing agent in accordance with the present invention is preferably supplied in the form of a glass frit, obtainable by per se known processes. In accordance therewith, the components consisting of oxides are mixed together, and the resulting mixture is brought to a temperature suitable to obtain a molten glass; this is then cooled by quenching it in water; the material thus obtained can finally be ground, obtaining small-sized particles.

When the composition for sealing agent is added with the filler, the latter preferably has a linear thermal expansion coefficient similar to that of the materials on which the sealing paste must be applied; the percentage of filler present in the composition for sealing agent can be varied, within the range 0-20% defined above, depending on the linear thermal expansion coefficient wished for the sealing paste.

The filler is a crystalline or glass-crystalline material, in which the crystalline component is cordierite and/or indialite; advantageously, the filler is used in a quantity such as to introduce from 8 to 12% by weight of crystalline phase, over the total of the resulting mixture. It can also comprise powders based on zirconium oxide ($ZrO_2$), used to regulate the linear thermal expansion coefficient.

The composition defined above allows the preparation of sealing pastes with a significantly low softening temperature, typically below 500° C., avoiding the use of lead and/or other toxic materials; it is thus possible to obtain high quality seals (stable, resistant, long-lasting) operating at significantly low process temperatures, ideal for electronic devices, in particular DSSC cells. More specifically, the softening temperature of the pastes is between 350 and 500° C., more preferably between 390 and 430° C. (particularly suitable for application on DSSC), and the linear thermal expansion coefficient is between 60 and $100\times10^{-7}$/° C.

Moreover, the composition for sealing agent of the present invention has the advantage of being electrically inert. Indeed, it has excellent dielectric capabilities of resistance to high voltages, without perforations induced by discharge The presence of tellurium, tin, titanium, yttrium oxides promotes a further lowering of the softening temperature of the paste, improving the contact with the vitreous substrate ("wettability") and thus the ability to form an excellent seal.

The presence of phosphorus oxide, in combination with the aluminium oxide, allows the formation of tetrahedral structures similar to those of silica (Silicate Glasses and Melts: Properties and Structure, I Edition, 2005, 393 Ed. Elsevier B.V., Amsterdam, NL,) thus further improving the mechanical stability.

The presence of calcium, potassium and lithium oxides lowers the glass transition temperature (Tg) of the composition. In order to maintain the properties of high electrical insulation of such a composition, however, it is necessary not to exceed 2% by weight of such oxides.

In addition to the components quoted above, it is possible to use iron, neodymium, copper and cobalt oxides to provide the composition with a desired degree of colouring and/or transparency. In particular, the presence of neodymium oxide up to 1% by weight provides transparency and colour-neutrality. Examples of commercial pigments used containing the aforementioned oxides are Instantcolor 229944, 249942, 279965 and 279946 (Ferro Co., USA). In an embodiment of the present invention, the following oxides are present, in percentage by weight over the total of the composition for sealing agent: 0-3% $Fe_2O3$; 0-1% $Nd_2O3$; 0-2% $CuO$; and 0-1% $CoO$; the overall concentration of these oxides is preferably at least equal to 2%.

The aforementioned composition for sealing agent with the optional filler, mixed with an organic binder and an optional organic solvent in the percentages defined above, forms sealing pastes useful for the purposes of the present invention.

The organic binder is selected in function of the desired application, as it must have the ability of homogeneously suspending the particles of the composition for sealing agent (thus having a good polarity so as to interact with the oxygen atoms present in the glass phase), it must evaporate or be completely eliminated during the firing cycle (see below) on the substrate (i.e. the surface of the device on which the paste is applied).

The homogeneity of the suspension is particularly advantageous since it ensures a good uniformity of application of the sealing paste in the entire area involved, and thus it allows seals with constant and reproducible quality.

The organic binder is selected in the group consisting of polyethylene glycols with number average molecular weight from 200 to 40,000; polyethylene glycols partially or totally substituted in the terminal OH groups by $C_1$-$C_4$ alkyl groups, $C_2$-$O_5$ carboxy alkyl groups, $C_3$-$C_4$ carboxy alkenyl groups or combinations thereof; polyethylene glycol derivatives of synthetic and/or natural resins, commercially available, like for example Kimiprint 1591 (Lamberti Ceramic Additives S.r.l.), polypropylene glycols with number average molecular weight from 400 to 4000; polypropylene glycols partially or totally substituted in the terminal OH groups by $C_1$-$C_4$ alkyl groups, $C_2$-$C_5$ carboxy alkyl groups, $C_3$-$C_4$ carboxy alkenyl groups or combinations thereof; block polymers of polyethylene glycols and polypropylene glycols, cellulose or partially substituted celluloses such as methyl cellulose, ethyl cellulose, hydroxypropyl cellulose, hydroxypropylmethyl cellulose, acetyl cellulose, acetyl cellulose butyrate; and mixtures thereof.

Preferably, the organic binder is selected in the group consisting of polyethylene glycols with number average molecular weight from 400 to 7000; polyethylene glycol derivatives of synthetic and/or natural resins, commercially available, like for example Kimiprint 1591 (Lamberti Ceramic Additives S.r.l); polypropylene glycols with number average molecular weight from 400 to 2000, ethyl cellulose, acetyl cellulose butyrate; and mixtures thereof.

The organic solvent is used to solubilise the binder. This will be selected based on the organic binder used in the sealing paste. According to the organic binder selected, it may not be necessary to use any organic solvent The organic solvent is selected in the group consisting of $C_1$-$C_8$ linear or branched aliphatic alcohols, $C_1$-$C_8$ aliphatic esters, optionally substituted by one or two atoms of oxygen of $C_2$-$C_6$ organic acids, terpenic alcohols such as terpineol and mixtures of its isomers; and mixtures thereof.

Preferably, the organic solvent is selected in the group consisting of ethanol; n-propanol; isopropanol; butyl carbitol acetate; n-butyl acetate, isobutyl, sec-butyl, or tert-butyl; n-butyl isovalerate; terpineol and mixtures of its isomers; and mixtures thereof.

It is possible to adjust, within the predetermined ranges, the respective concentrations of the aforementioned components of the sealing paste to obtain the most suitable viscosity depending on whether the paste must be processed for serigraphy or be deposited on the substrate by the "doctor blade" technique, etc. In a preferred embodiment, the viscosity is between 60 and 100 kcps at 25° C., determined with a Brookfield mod. DVII+ viscometer with SC4-27 spindle and adapter 13RP at 10 rpm, and the sealing paste is suitable for being processed for serigraphy The paste thus obtained with the desired viscosity is further refined using a refiner with three rollers so as to obtain a homogeneous size distribution of the particles, preferably between 3 and 10 microns, said size homogeneity being important to obtain depositions with constant thickness during the serigraphic printing process.

It is very important, indeed, to keep a certain grain size of the sealing paste, since this allows obtaining optimal, uniform and reproducible performance even when a very small amount of paste (from 10 to 30µ) is applied. The thickness of the seal, indeed, should be as low as possible, in order to minimise the entry of external gas and humidity.

The sealing paste, deposited on the substrate, is subjected to a firing cycle (sintering) to allow the glass to adhere to the substrate itself. The temperature lies generally within a range between 400 and 550° C., preferably between 410 and 510° C., more preferably between 430 and 490° C. The paste thus treated has a softening temperature below 500° C., such temperature being directly conferred by the composition for sealing agent used. Then a further heat treatment (sealing) is performed, carried out at the softening temperature of the paste, which results in the actual sealing between the paste and the substrate. The entire treatment (sintering and sealing) is thus carried out at temperatures below 500° C., which is particularly advantageous for sealing electronic devices such as LEDs and DSSC cells, since it avoids damaging the semiconductor components present in these devices by thermal stress.

The present invention also comprises a method for producing the sealing agent composition defined previously, in the form of glass frit, which comprises the steps of:
a) mixing those components of the composition consisting of oxides, obtaining a homogeneous mixture;
b) bringing such homogeneous mixture to a temperature between 800° C. and 1200° C., preferably between 900° and 1100° C. for about 45 minutes thus forming a molten glass;
c) subjecting such molten glass to rapid cooling in water;
d) grinding the material obtained in step c) thus obtaining a powder with particles of dimension between 3 and 10 micron.
e) optionally mixing such a powder with a quantity of filler up to 20% by weight over the total weight of the resulting mixture.

The present invention also refers to a method for producing the sealing paste defined above, which comprises mixing, in percentage by weight over the total of the paste: 70-90% of the composition for sealing agent defined above (including the optional filler), 1-30% of an organic binder and optionally 0-20% of an organic solvent. Such mixing preferably takes place at room temperature and for about 1 hour.

The paste thus obtained can be applied onto the substrate according to per se known methods (for example, Sastrawan et al. 2006).

Moreover, the present invention comprises the use of the composition for sealing agent as defined above for the preparation of a sealing paste.

Moreover, the invention comprises the use of a sealing paste as defined above for sealing electronic devices like for example liquid crystal displays (LCDs), light emitting diodes (LEDs), organic light emitting diodes (OLEDs), MEMS (Micro Electro Mechanical Systems) elements, fuel cells, dye-sensitized solar cells (DSSC).

Finally, the present invention comprises an electronic device, preferably a DSSC cell, an LCD, an (O)LED, a MEMS element, or a fuel cell, more preferably a DSSC cell, sealed with the paste defined above.

The invention will now be described further, with no limiting function, by the following examples.

EXAMPLES 1-7

Seven different compositions for sealing agent were prepared according to the formulations indicated in Table 1. For each composition for sealing agent a mixture was prepared from the oxides listed in Table 1, mixing being carried out in a ball mill with rotation equal to 100 rpm.

The mixture thus obtained was melted at a temperature of 900-1200° C., the molten mass thus obtained was poured quickly into water at room temperature obtaining a glass frit that was collected and ground in a mill with zirconium balls for 120 minutes at 600 rpm to obtain a fine powder with particle dimensions of the particles between 3 and 10 microns.

In the case in which it was wished to obtain a coloured glass frit (Examples 1 to 4 and 6), the composition was added during grinding with one or more among $Fe_2O_3$, $Nd_2O_3$, CuO and CoO in the quantities indicated in Table 1. The composition thus obtained is mixed with a filler (example 5: indialite; remaining examples: cordierite), in the quantities indicated in Table 1.

In Table 1, for each example, the glass transition temperature (Tg) is also indicated; the table also indicates the softening temperature (° C.) of the composition for sealing agent, which is also found in the corresponding pastes (see examples 9-15).

TABLE 1

Formulation of compositions for sealing agent.

| | Example 1 | Example 2 | Example 3 | Example 4 | Example 5 | Example 6 | Example 7 |
|---|---|---|---|---|---|---|---|
| $Bi_2O_3$ | 63 | 62 | 54 | 60 | 61 | 60 | 60 |
| ZnO | 7 | 5 | 6 | 5 | 5 | 5 | 5 |
| $B_2O_3$ | 6 | 5 | 8 | 7 | 6 | 7 | 6 |
| $SiO_2$ | 6 | 8 | 7 | 8 | 8 | 10 | 8 |
| $Al_2O_3$ | 5 | 7 | 4 | 5 | 2 | 7 | 3 |
| BaO | 4 | 0 | 3 | 0 | 0 | 6 | 6 |
| MgO | 2 | 7 | 3 | 7 | 6 | 1 | 0 |
| $Na_2O$ | 0 | 0 | 0 | 2 | 2 | 2 | 2 |
| $TeO_2$ | 0 | 0 | 0 | 0 | 1 | 0 | 1 |
| $TiO_2$ | 0 | 0 | 1 | 0 | 0 | 0 | 0 |
| $Y_2O_3$ | 0 | 0 | 0 | 0 | 0 | 1 | 0 |
| $P_2O_5$ | 0 | 0 | 0 | 0 | 1 | 0 | 1 |
| CaO | 1 | 0 | 0 | 0 | 0 | 0 | 0 |
| $Li_2O$ | 0 | 0 | 0 | 0 | 0 | 0 | 1 |
| $Fe_2O_3$ | 1 | 0 | 2 | 0 | 0 | 0 | 0 |
| $Nd_2O_3$ | 0 | 0 | 0 | 0 | 0 | 1 | 0 |
| CuO | 2 | 1 | 0 | 1 | 0 | 0 | 0 |
| CoO | 0 | 0 | 1 | 0 | 0 | 0 | 0 |
| Total % | 97 | 95 | 88 | 95 | 92 | 100 | 93 |
| Soft. temp (° C.) | 400 | 410 | 420 | 415 | 407 | 390 | 405 |
| TG (° C.) | 375 | 390 | 400 | 400 | 380 | 365 | 390 |
| Filler % | 3 | 5 | 12 | 5 | 8 | 0 | 7 |

All examples led to optimal results, having obtained a softening temperature between 390 and 420° C.

EXAMPLE 8 (COMPARATIVE)

Similarly to what is described in the preparation of examples 1-7, a composition for sealing agent was prepared using the list of oxides shown in Table 2 (% expressed in p/p). As evident, the composition of the glass frit has a very low bismuth oxide content with respect to the present invention and, on the other hand, a very high quantity of silicon oxide.

TABLE 2

Formulation of composition for sealing agent, comparative example.

| | |
|---|---|
| $Bi_2O_3$ | 4% |
| ZnO | 11% |
| $B_2O_3$ | 3% |
| BaO | 1% |
| $SiO_2$ | 57% |
| $Na_2O$ | 18% |
| $TeO_2$ | 4% |
| $P_2O_5$ | 1% |

Such a composition, and the paste made therewith, have a softening temperature above 600° C.

EXAMPLE 9

120 grams of the composition for sealing agent of Example 1 were mixed at room temperature and for 1 hour with 20.5 g of terpineol, as organic solvent, and with 2.1 g of ethyl cellulose, as organic binder (the degree of polymerisation of which confers a viscosity of 300 cP measured in solution of 5% ethanol/toluene 20/80) thus obtaining a paste.

The paste, after sintering (420° C. for 1 hour) showed a softening temperature equal to 400° C. and a linear thermal expansion coefficient equal to $76 \times 10^{-7}$/° C.

EXAMPLE 10

Similarly to what is described in the previous Example 9, a paste was prepared from 120 g of the composition for sealing agent of Example 2 by mixing the latter with 20.5 g of terpineol and with 2.1 g of ethyl cellulose (300 cP solution 5% ethanol/toluene 20/80).

The paste, after sintering, showed a softening temperature equal to 410° C. and a linear thermal expansion coefficient equal to $75 \times 10^{-7}$/° C.

EXAMPLE 11

Similarly to what is described in the previous Example 9, a paste was prepared from 120 g of the composition for sealing agent of Example 3 by mixing the latter with 19.2 grams of Kimiprint 1591 (polyethylene glycol derivatives of synthetic and/or natural resins)

The paste, after sintering, showed a softening temperature equal to 420° C. and a linear thermal expansion coefficient equal to $73 \times 10^{-7}$/° C.

EXAMPLE 12

Similarly to what is described in the previous Example 9, a paste was prepared from 120 g of the composition for sealing agent of Example 4 by mixing the latter with 2.2 grams of acetyl cellulose butyrate (Mn 30,000) and with 19.4 grams of butyl carbitol.

The paste after sintering showed a softening temperature equal to 415° C. and a linear thermal expansion coefficient equal to $75 \times 10^{-7}$/° C.

EXAMPLE 13

Similarly to what is described in the previous Example 9, a paste was prepared from 120 g of the composition for sealing agent of Example 5 by mixing the latter with 2.2 grams of acetyl cellulose butyrate (Mn 30,000) and with 19.4 grams of terpineol.

The paste, after sintering, showed a softening temperature equal to 407° C. and a linear thermal expansion coefficient equal to 75×10$^{-7}$/° C.

EXAMPLE 14

Similarly to what is described in the previous Example 9, a paste was prepared from 120 g of the composition for sealing agent of Example 6 with 19.2 grams of Kimiprint 1591.

The paste, after sintering, showed a softening temperature equal to 390° C. and a linear thermal expansion coefficient equal to 95×10$^{-7}$/° C.

EXAMPLE 15

Similarly to what is described in the previous Example 9, a paste was prepared from 120 g of composition for sealing agent of Example 7 with 19.2 grams of Kimiprint 1591(polyethylene glycol derivatives of synthetic and/or natural resins)

The paste, after sintering, showed a softening temperature equal to 405° C. and a linear thermal expansion coefficient equal to 83×10$^{-7}$/° C.

EXAMPLE 16

A DSSC cell was then prepared using the sealing paste prepared according to Example 14. The DSSC cell was assembled as shown in Spat M. Progress Photov. (2003), 11(3), 207-220 and its sealing was carried out as shown in Sastrawan R. Solar Energy Mat. and Solar cells (2006), 90(11), 1680-1691 using the paste described in example 14 at the sintering temperature of 420° C. and at the sealing temperature of 470° C.

The composition for sealing agents of the present invention and the sealing paste that contains it is thus lead-free, and therefore complies with current safety parameters and does not contain other toxic and/or harmful material to man or to the environment. Moreover, the aforementioned compositions and paste of the invention are characterised by optimal performance in the sealing of electronic devices in general. Indeed, they are able to make the device highly impermeable to external gas and humidity. Finally, they have softening temperatures below 500° C., thus being particularly suitable for use in association with electronic devices that cannot withstand very high temperatures, such as LEDs and DSSCs.

The low process temperature capable of making two surfaces perfectly stuck together with the paste object of the present invention allow use also in the field of industry of semiconductors for sealing conductive electronic glass.

For this reason, since such a paste comprises the composition for sealing agent of the present invention particularly suitable for sealing conductive glass substrates, it can be used for photovoltaic panels, in particular for dye-sensitized solar cells (DSSC) and for use as sealing agent material for the protection of the internal components of the cell against external aggressive agents such as atmospheric gases, humidity, further being particularly inert to chemical attack by the internal components of the cell and to photo-oxidisation action.

BIBLIOGRAPHY

Hinsch, A., Kroon, J. M., Kern, R., Uhlendorf, I., Holzbock, J., Meyer, A. and Ferber, J (2001) Long-term stability of dye-sensitized solar cells. Progress in Photovoltaics: Research and Applications, 9, 425-438

Kohle, O., Grüatzel, M., Meyer, A. F. and Meyer, T. B. (1997) The photovoltaic stability of bis(isothiocyanato)ruthenium (II)-bis-2,2'-bipyridine-4,4'-dicarboxylic acid and related sensitizers. Advanced Materials, 9, No. 11, 904-906

Matsui, H., Okada, K., Kitamura, T. and Tanabe, N. (2009) Thermal stability of dye-sensitized solar cells with current collecting grid. Solar Energy Materials 86 Solar Cells, 93, 1110-1115

Sastrawan, R., Beier, J., Belledin, U., Hemming, S., Hinsch, A., Kern, R., Vetter, C., Petrat, F. M., Prodi-Schwab, A., Lechner, P. and Hoffmann, W. (2006) New interdigital design for large area dye solar modules using a lead-free glass frit sealing. Progess in Photovoltaics: Research and Applications, 14, 697-709

The invention claimed is:

1. A lead-free composition, comprising about: 60% $Bi_2O_3$, 5% ZnO, 7% $B_2O_3$, 10% $SiO_2$, 7% $Al_2O_3$, 6% BaO, 1% MgO, 2% $Na_2O$, 1% $Y_2O_3$, and 1% $Nd_2O_3$, based on the total weight of the composition.

2. The composition for sealing agent according to claim 1, in the form of a glass frit.

3. A process to prepare the composition for sealing agent according to claim 1, which comprises the steps of:
   a) mixing said $Bi_2O_3$, ZnO, $B_2O_3$ $SiO_2$ $Al_2O_3$, $B_2O$, MgO, $Na_2O$, $Y_2O_3$ and $Nd_2O_3$ obtaining a homogeneous mixture;
   b) bringing said homogeneous mixture to a temperature between 800° C. and 1200° C., for about 45 minutes thus forming a molten glass;
   c) subjecting said molten glass to rapid cooling in water;
   d) grinding the material obtained in step c), thus obtaining a powder having particles of dimensions between 3 and 10 micron.

4. A sealing paste, comprising the composition of claim 1 added with a filler, an organic binder and/or an organic solvent.

5. The sealing paste according to claim 4, wherein the filler is cordierite and/or indialite.

6. The sealing paste according to claim 4, wherein the binder is selected from the group consisting of polyethylene glycols with number average molecular weight from 200 to 40,000; polyethylene glycols partially or totally substituted in the terminal OH groups by $C_1$-$C_4$ alkyl groups, $C_2$-$C_5$ carboxy alkyl groups, $C_3$-$C_4$ carboxy alkenyl groups or combinations thereof; polyethylene glycol derivatives of synthetic and/or natural resins, polypropylene glycols with number average molecular weight from 400 to 4000; polypropylene glycols partially or totally substituted in the terminal OH groups by $C_1$-$C_4$ alkyl groups, $C_2$-$C_5$ carboxy alkyl groups, $C_3$-$C_4$ carboxy alkenyl groups or combinations thereof; block polymers of polyethylene glycols and polypropylene glycols, cellulose or partially substituted celluloses such as methyl cellulose, ethyl cellulose, hydroxypropyl cellulose, hydroxypropylmethyl cellulose, acetyl cellulose, acetyl cellulose butyrate; and mixtures thereof.

7. The sealing paste according to claim 6, wherein the binder is selected from the group consisting of polyethylene glycols with number average molecular weight from 400 to 7000; polyethylene glycol derivatives of synthetic and/or natural resins, polypropylene glycols with number average molecular weight from 400 to 2000, ethyl cellulose, acetyl cellulose butyrate; and mixtures thereof.

8. The sealing paste according to claim 4, wherein the solvent is selected from the group consisting of: $C_1$-$C_8$ linear or branched aliphatic alcohols, $C_1$-$C_8$ aliphatic esters, optionally substituted by one or two atoms of oxygen of $C_2$-$C_6$ organic acids, terpenic alcohols such as terpineol and mixtures of its isomers; and mixtures thereof.

9. The sealing paste according to claim 8, wherein the solvent is selected from the group consisting of: ethanol, n-propanol, isopropanol, butyl carbitol acetate, n-butyl acetate, isobutyl, sec-butyl, or tert-butyl; n-butyl isovalerate, terpineol and mixtures of its isomers; and mixtures thereof.

10. An electronic device sealed with the sealing paste of claim 4, said electronic device being selected from the group consisting of a DSSC cell, an LCD, an (O)LED, a MEMS element, and a fuel cell.

11. The process according to claim 3, wherein in step b) said homogeneous mixture is brought to a temperature between 900° C. and 1100° C. for about 45 minutes thus forming a molten glass.

\* \* \* \* \*